US010574120B2

(12) United States Patent
Im et al.

(10) Patent No.: US 10,574,120 B2
(45) Date of Patent: Feb. 25, 2020

(54) INVERTER BUILT-IN BRUSHLESS DIRECT CURRENT MOTOR

(71) Applicant: Hanon Systems, Daejeon (KR)

(72) Inventors: Ho Bin Im, Daejeon (KR); Sang Hun Kim, Daejeon (KR); Tae Wan Kim, Daejeon (KR); Hee Kwon Park, Daejeon (KR); Kyung Hun Jung, Daejeon (KR); Seong Kook Cho, Daejeon (KR)

(73) Assignee: Hanon Systems, Daejeon (KR)

( * ) Notice: Subject to any disclaimer, the term of this patent is extended or adjusted under 35 U.S.C. 154(b) by 273 days.

(21) Appl. No.: 15/673,617

(22) Filed: Aug. 10, 2017

(65) Prior Publication Data

US 2018/0048218 A1 Feb. 15, 2018

(30) Foreign Application Priority Data

Aug. 11, 2016 (KR) .................. 10-2016-0102084
Apr. 21, 2017 (KR) .................. 10-2017-0051620

(51) Int. Cl.
*H02K 11/33* (2016.01)
*H02K 5/10* (2006.01)
*H02K 5/22* (2006.01)
*H02K 21/16* (2006.01)

(52) U.S. Cl.
CPC ............... *H02K 11/33* (2016.01); *H02K 5/10* (2013.01); *H02K 5/225* (2013.01); *H02K 21/16* (2013.01)

(58) Field of Classification Search
CPC .. H02K 5/10; H02K 5/12; H02K 5/22; H02K 5/225; H02K 11/30; H02K 11/33

USPC ...................................................... 310/71, 89
See application file for complete search history.

(56) References Cited

U.S. PATENT DOCUMENTS

| 9,966,815 B2* | 5/2018 | Kamiya | .................. H02K 1/12 |
| 2017/0201148 A1* | 7/2017 | Haga | ....................... H02K 3/28 |
| 2019/0036434 A1* | 1/2019 | Ohshita | ............... H02K 11/215 |

FOREIGN PATENT DOCUMENTS

| JP | 2002252958 A | 9/2002 |
| JP | 2003204654 A | 7/2003 |
| JP | 2005117708 A | 4/2005 |
| JP | 2009189178 A | 8/2009 |
| JP | 2013253587 A | 12/2013 |
| WO | 2016075821 A1 | 5/2016 |

* cited by examiner

*Primary Examiner* — Nguyen Tran
(74) *Attorney, Agent, or Firm* — Norton Rose Fulbright US LLP

(57) ABSTRACT

Provided is an inverter built-in brushless direct current (BLDC) motor, in which an inverter housing and a cover are coupled to each other by having a connector block interposed therebetween, a sealing portion formed in the connector block seals between a circumference in a height direction and a length direction of the connector block and an inner side surface of the inverter housing and the cover, and a space between an electric wire penetrating through an electric wire through hole and the connector block, thereby simplifying parts for forming a watertight structure, easily sealing between the inverter unit and the connector block and sealing between the connector block and the electric wire, and reducing a package size including a connector block assembling part formed in the inverter unit and the connector block.

13 Claims, 14 Drawing Sheets

INVERTER BUILT-IN BRUSHLESS DIRECT CURRENT MOTOR

CROSS-REFERENCE TO RELATED APPLICATIONS

This application claims priority under 35 U.S.C. § 119 to Korean Patent Application No. 10-2016-0102084, filed on Aug. 11, 2016 and No. 10-2017-0051620 filed on Apr. 21, 2017 in the Korean Intellectual Property Office, the disclosure of which is incorporated herein by reference in its entirety.

TECHNICAL FIELD

The following disclosure relates to an inverter built-in brushless direct current (BLDC) motor, and more particularly, to an inverter built-in BLDC motor capable of simplifying parts for forming a watertight structure by forming a connector block for water tightness with electric wires connected to an inverter unit and easily sealing between the inverter unit and the connector block and sealing between the connector block and the electric wires.

BACKGROUND

A brushless direct current (BLDC) motor may prevent friction and wear which are disadvantages of the existing DC motor and have relatively high efficiency. Therefore, recently, hybrid cars tend to adopt the BLDC motor as a motor for rotating a cooling fan.

The BLDC motor is a motor that does not have a brush and a commutator necessary for a DC motor but has an electronic commutation mechanism installed therein.

Further, the existing BLDC motor assembly for a low-voltage cooling fan for a vehicle has a motor unit and an inverter unit that are formed integrally, and thus is configured of an inverter built-in BLDC motor. Here, as illustrated in FIG. 1, an inverter housing 21 is coupled to a lower side of the motor unit 10, a cover 22 is coupled to a lower side of the inverter housing 21, and a PCB substrate is provided in an internal space formed by the inverter housing 21 and the cover 22, such that the inverter unit 20 is formed. Further, one side of the inverter unit 20 is provided with a connector block assembling part 23 for connecting an internal PCB substrate and an external inverter control unit to each other by a power supply line and a communication line, and a connector block assembling part 23 is provided with a through hole 24 for connecting between an inside and an outside thereof. Further, the connector block 30 is provided with a communicating tube 31 protruding from one surface thereof and thus is fastened to the connector block assembling part 23 by a fastener or the like so that the communicating tube 31 is inserted into the through hole 24. At this point, the communicating tube 31 is inserted into a through hole 24 in a state where a connector sealing rubber 40 such as an O-ring is inserted into an outer side of the communicating tube 31, such that a space between the communicating tube 31 and the through hole 24 is sealed. Further, the electric wires is connected to the PCB substrate in the inverter unit 20 through the communicating tube 31 and the through hole 24 and the sealing rubber such as wire sealing is used to seal between the electric wires and an inner circumferential surface of the communicating tube 31.

That is, since the existing inverter built-in BLDC motor uses several sealing rubbers for water tightness between the inverter unit 20 and the connector block 30 and water tightness between the connector block 30 and the electric wires, a structure of a connector block package including the connector block, the sealing rubber or the like is complicated, such that a process of producing and assembling parts may be complicated and manufacturing costs may be increased.

RELATED ART DOCUMENT

JP 2005-117708 A (Apr. 4, 2005)

SUMMARY

An embodiment of the present invention is directed to providing an inverter built-in BLDC motor capable of easily sealing between an inverter unit and a connector block and sealing between the connector block and electric wires by forming a connector block for water tightness with the electric wires connected to an inverter unit and simplifying parts for forming a watertight structure.

In one general aspect, an inverter built-in BLDC motor includes: an inverter housing 200 having one side coupled to a motor 100, and an inside formed to be hollow, the other side formed to be open, provided with an opening portion 240 through which a portion of an edge wall 230 is open, and having a PCB substrate 210 provided in the hollow portion; a cover 300 coupled to an open lower side of the inverter housing 200 to seal a surface contacting the inverter housing 200; a connector block 400 interposed in a space formed by the opening portion 240 of the inverter housing 200 and the cover 300 and provided with an electric wire through hole 440 in a width direction so that an electric wire 500 is inserted to penetrate through the electric wire through hole; and an electric wire side terminal 510 coupled to an end 501 of the electric wire 500 penetrating through the connector block 400.

The inverter built-in BLDC motor may include: a sealing portion 600 formed to be bonded to the connector block 400 to enclose both surfaces in a length direction and both surfaces in a height direction of the connector block 400 and bonded to an inner side surface in a width direction of the connector block 400 from which the end 501 of the electric wire 500 is drawn out and the end 501 of the electric wire 500, in which the sealing portion 600 may be formed to seal between a circumference in the height direction and the length direction of the connector block 400 and an inner side surface of the inverter housing 200 and the cover 300 and seal between the electric wire 500 coupled by penetrating through the electric wire through hole 440 and the connector block 400.

The sealing portion 600 may include: a first sealing portion 610 formed to be bonded to the connector block 400 to enclose both surfaces in the length direction and both surfaces in the height direction of the connector block 400 and to be equal to or greater than a length and a width of the connector block 400; and a second sealing portion 620 formed to be bonded to the inner side surface in the width direction of the connector block 400 from which the end 501 of the electric wire 500 is drawn out and the end 501 of the electric wire 500.

The connector block 400 may be provided with a flange 415 protruding in a width direction and a length direction and the first sealing portion 610 may be formed to be bonded to one side surface in the width direction of the flange 415 and the flange 415 may be provided with the communication part 416 connecting both side surfaces of the flange in the width direction.

The inverter housing 200 may have a guide groove 250 concavely formed on an inner side surface thereof and thus the flange 415 and the first sealing portion 610 of the connector block 400 may be inserted into and seated on the guide groove 250.

The inverter housing 200 may have an assembling part 410 of the connector block 400 inserted between ends 232 of edge walls on both sides in a length direction with which the opening portion 240 is provided, and a coupling groove 231 may be formed along the edge wall 230 of the inverter housing 200, the assembling part 410 of the connector block 400 may be provided with a sealing material applying groove 413 connected to the coupling groove 231, and a protruding part 311 may be formed along the edge wall 310 of the cover 300 so that the protruding part 311 is inserted into the coupling groove 231 and the sealing material applying groove 413.

The sealing portion 600 may be formed by insert injection or application or is formed of an O-ring.

The coupling groove 231 and the sealing material applying groove 413 may be filled with a sealing material 630 to seal between the coupling groove 231 and the protruding part 311 and between the sealing material applying groove 413 and the protruding part 311.

The connector block 400 may have a blocking plate 420 formed in an inside direction of the inverter housing 200 in the width direction from the assembling part 410 and the blocking plate 420 may be formed to enclose the end 501 of the electric wire 500 drawn out toward the inner side in the width direction through the electric wire through hole 440 to form a space portion 430 on the inside, and the electric wire side terminal 510 may be coupled to penetrate through the blocking plate 420 and thus the end 501 of the electric wire 500 may be coupled to the electric wire side terminal 510 in the space portion 430.

A second sealing portion 620 may be formed by being filled in the space portion 430 of the connector block 400.

The inverter housing 200 may be provided with a block fastening part 220, the connector block 400 may be provided with a coupling portion 421, and the coupling portion 421 may be fixedly fastened to the block fastening part 220 by the fastener 422.

The PCB substrate 210 provided in the inverter housing 200 may be provided with the substrate side terminal 211 to couple between the substrate side terminal 211 and the electric wire side terminal 510.

An end of the substrate side terminal 211 and an end of the electric wire side terminal 510 may be bent upward to face each other and the bent bending portions 212 and 511 may be coupled to each other while being in surface contact with each other.

The PCB substrate 210 provided in the inverter housing 200 may be provided with a substrate side PCB terminal 211a and the stator 110 provided in the motor 100 may be provided with a three-phase terminal 120 and the three-phase terminal 120 of the stator 110 may penetrate through the inverter housing 200 and the PCB substrate 210 so that the substrate side PCB terminal 211a and the three-phase terminal are coupled to each other while being in surface contact with each other.

Other features and aspects will be apparent from the following detailed description, the drawings, and the claims.

DETAILED DESCRIPTION OF MAIN ELEMENTS

Figure 1:
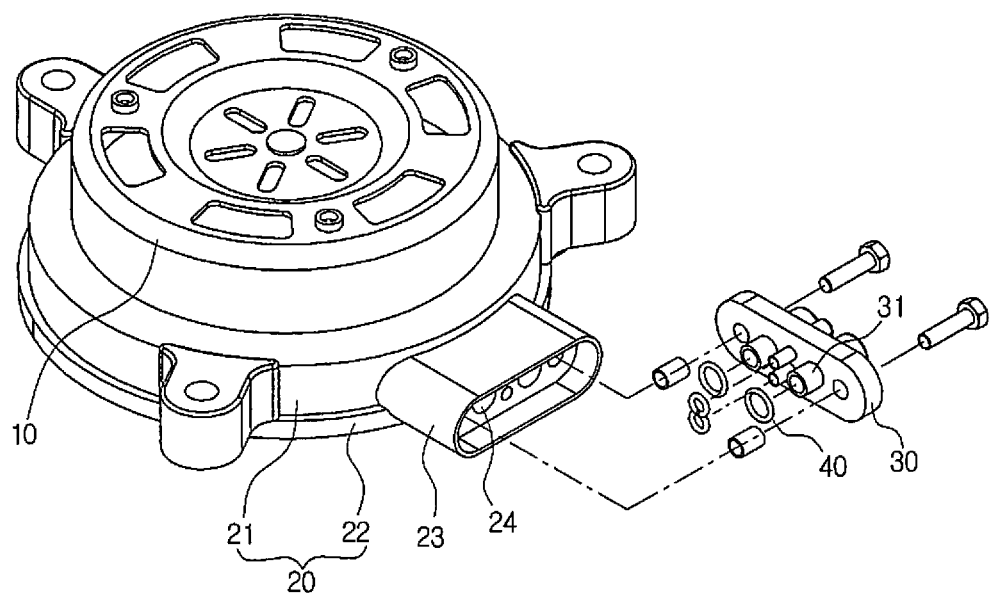
FIG. 1 is an exploded perspective view illustrating a watertight structure of the existing inverter built-in BLDC motor.

1000: Inverter built-in BLDC motor
100: Motor
110: Stator
120: Three-phase terminal
200: Inverter housing
210: PCB substrate
211: Substrate side terminal
211a: Substrate side PCB terminal
212a: Bending portion
212: Bending portion
220: Block fastening part
230: Edge wall
231: Coupling groove
232: End of edge wall
240: Opening portion
241: Stepped part
250: Guide groove
251: Guide rib
300: Cover
310: Edge wall
311: Protruding part
400: Connector block
410: Assembling part
413: Sealing material applying groove
415: Flange
416: Communicating part
420: Blocking plate
421: Coupling portion
422: Fastener
430: Space portion
440: Electric wire through hole 500: Electric wire
501: End
510: Electric wire side terminal
511: Bending portion
600: Sealing portion
610: First sealing portion
620: Second sealing portion
630: Sealing material

DETAILED DESCRIPTION OF EMBODIMENTS

Hereinafter, an inverter built-in BLDC motor according to an exemplary embodiment of the present invention having a configuration as described above will be described in detail with reference to the accompanying drawings.

Figure 2:
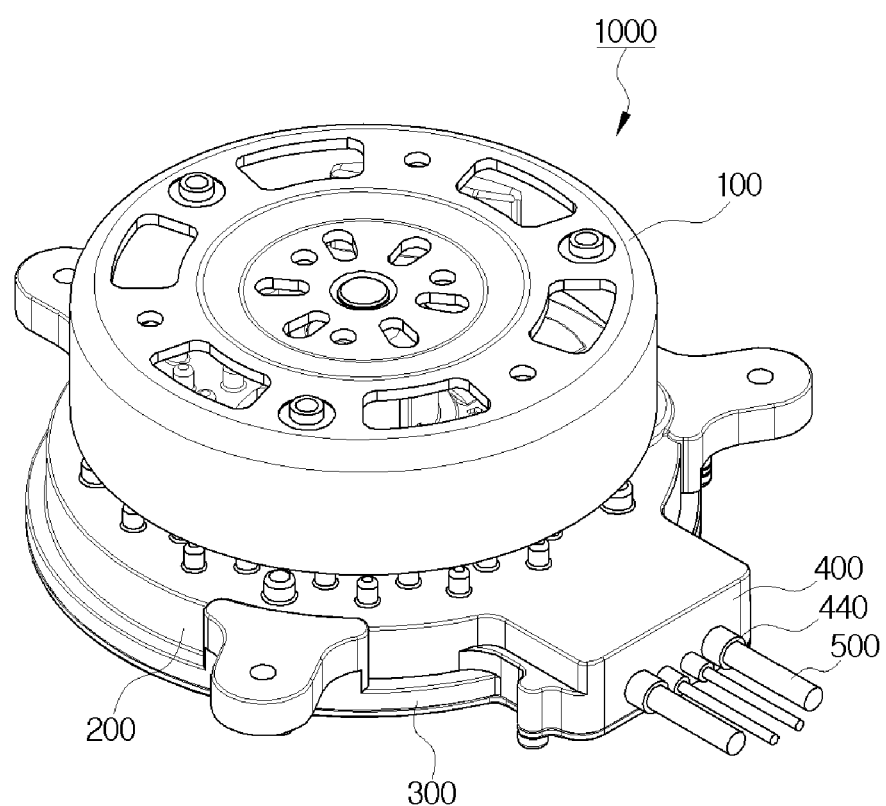
FIG. 2 is an assembled perspective view illustrating an inverter built-in BLDC motor according to an exemplary embodiment of the present invention.
Figure 3:
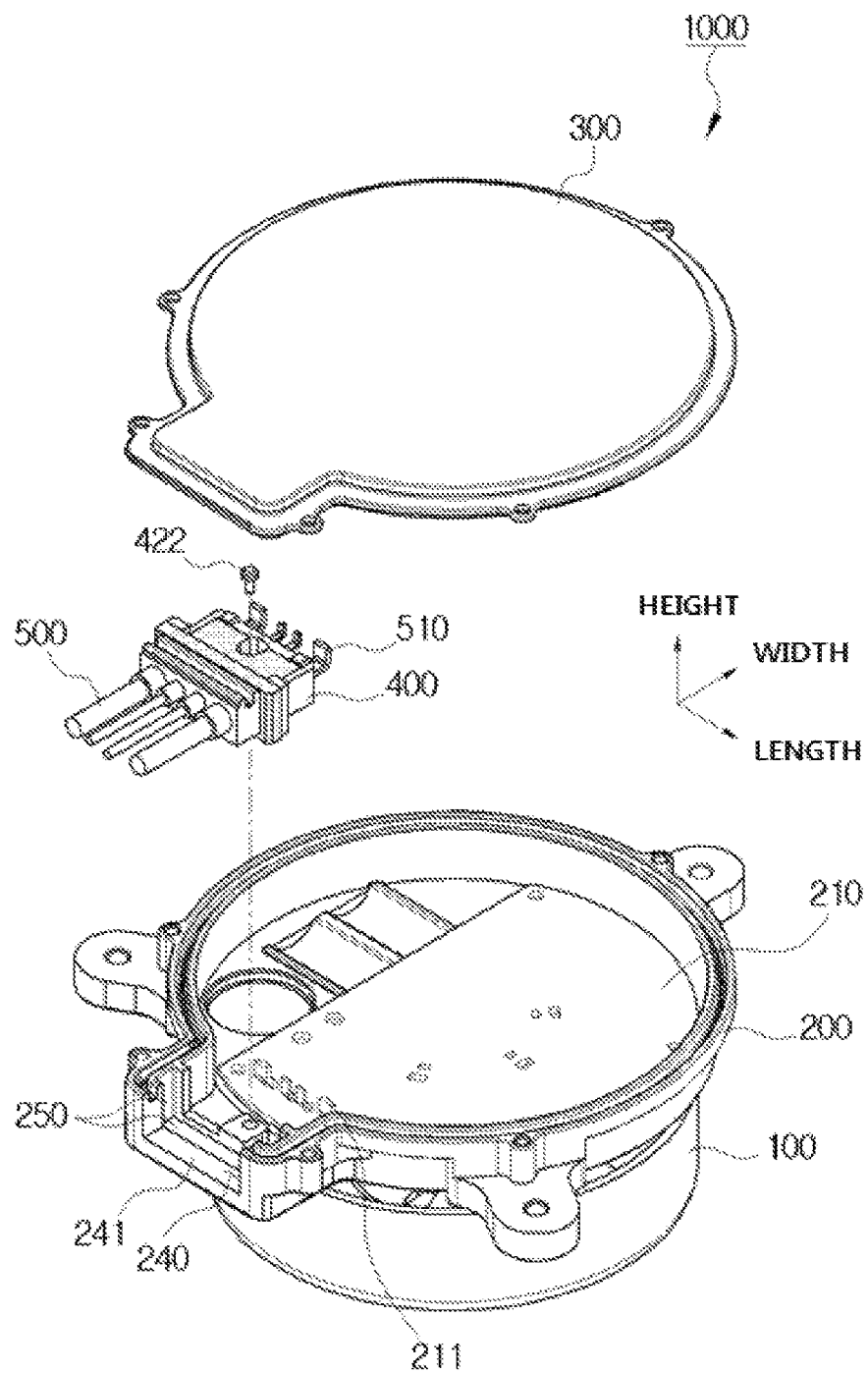
FIG. 3 is an exploded perspective view of a state where the inverter built-in BLDC motor according to the exemplary embodiment of the present invention is turned over.
Figure 4:
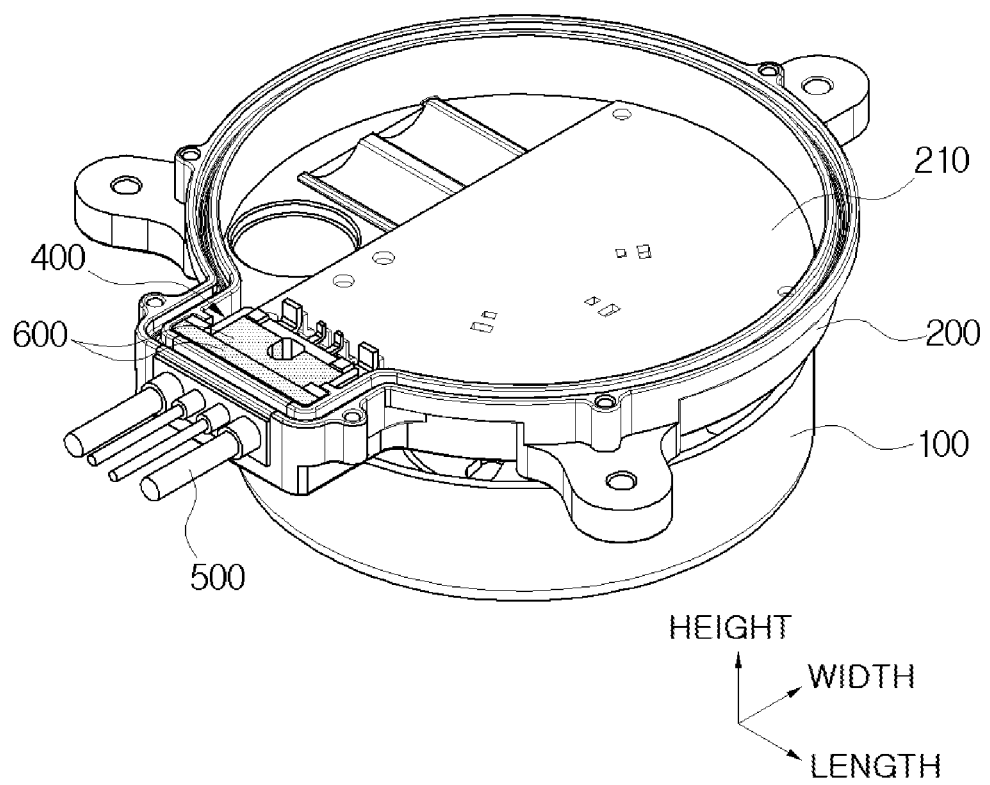
FIG. 4 is an assembled perspective view of a state where a connector block in FIG. 3 is assembled in an inverter housing.
Figure 5:
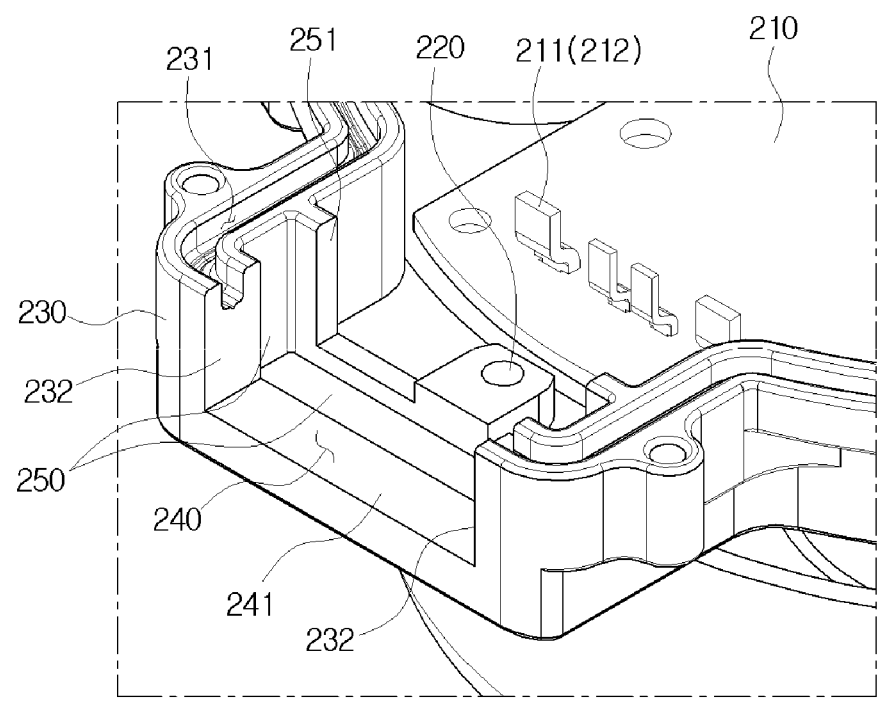
FIG. 5 is a partial perspective view of the inverter housing in a part where the connector block according to the exemplary embodiment of the present invention is assembled.
Figure 6:
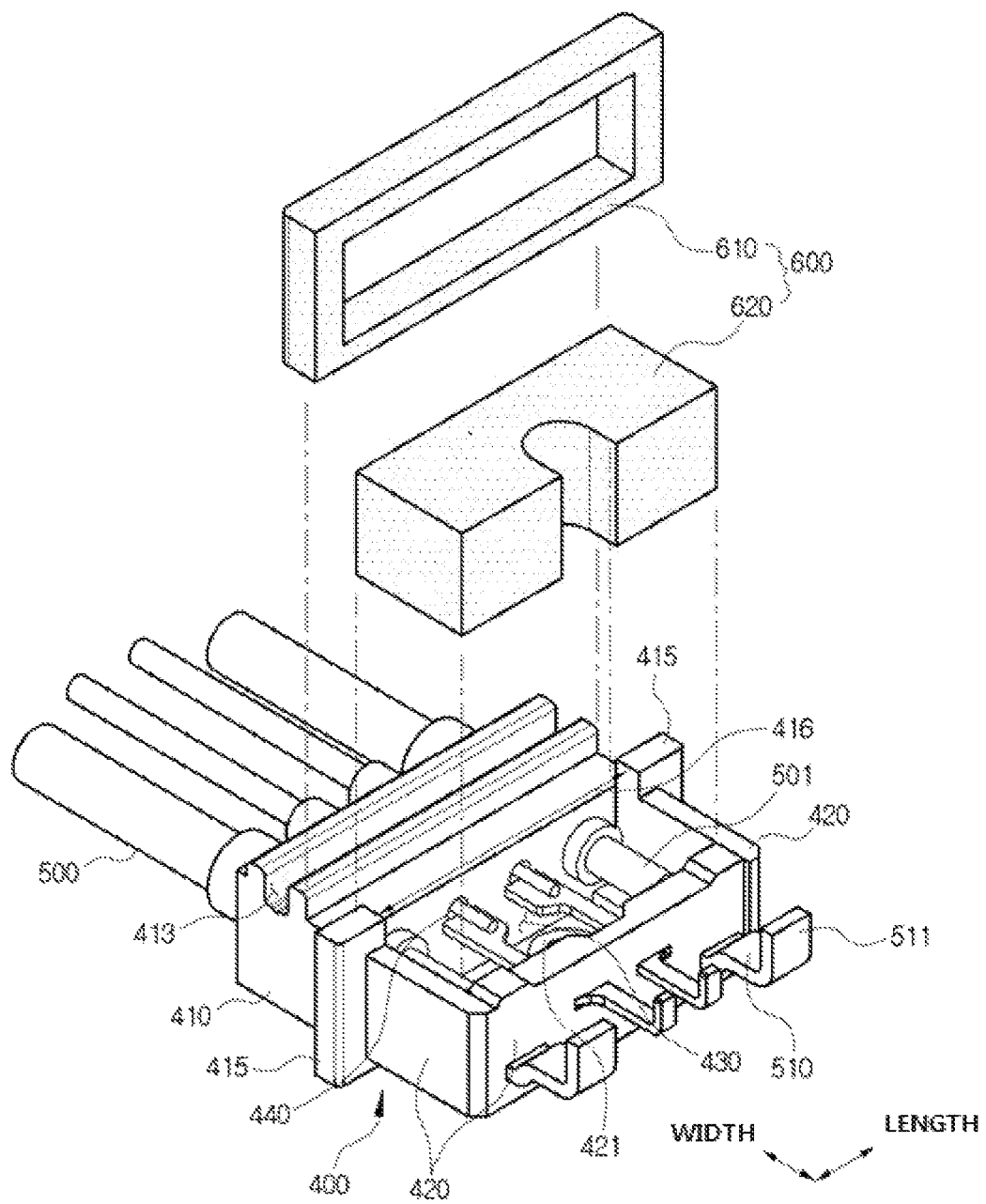
FIG. 6 is an exploded perspective view illustrating a state where electric wires and an electric wire side terminal are assembled in the connector block according to the exemplary embodiment of the present invention and a sealing portion is formed.
Figure 7:
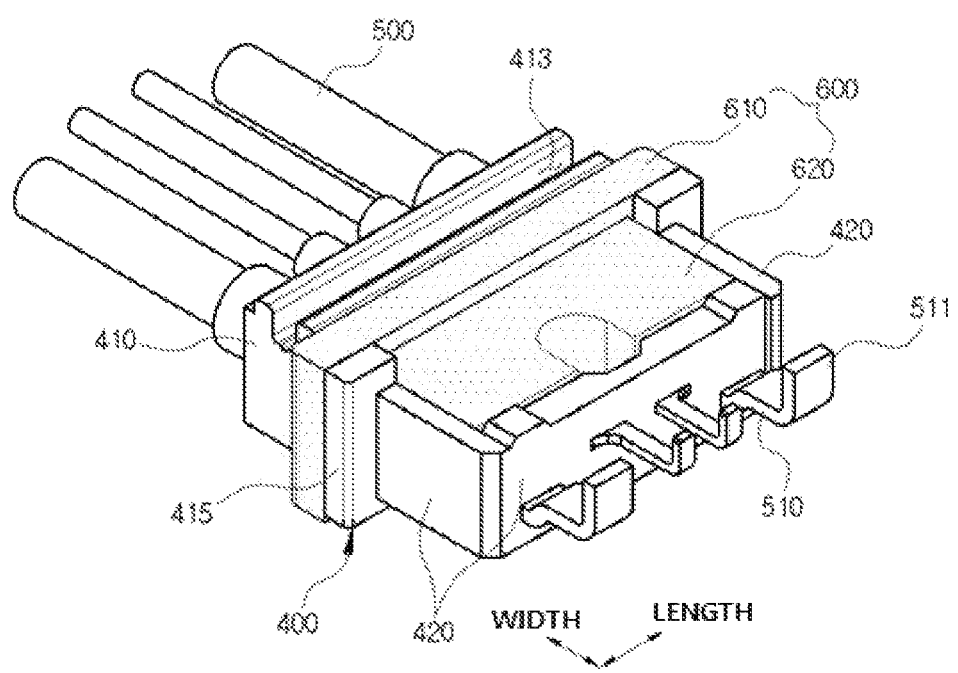
FIG. 7 is a perspective view illustrating a state in which a sealing portion is coupled to a connector block in FIG. 6.
Figure 8:
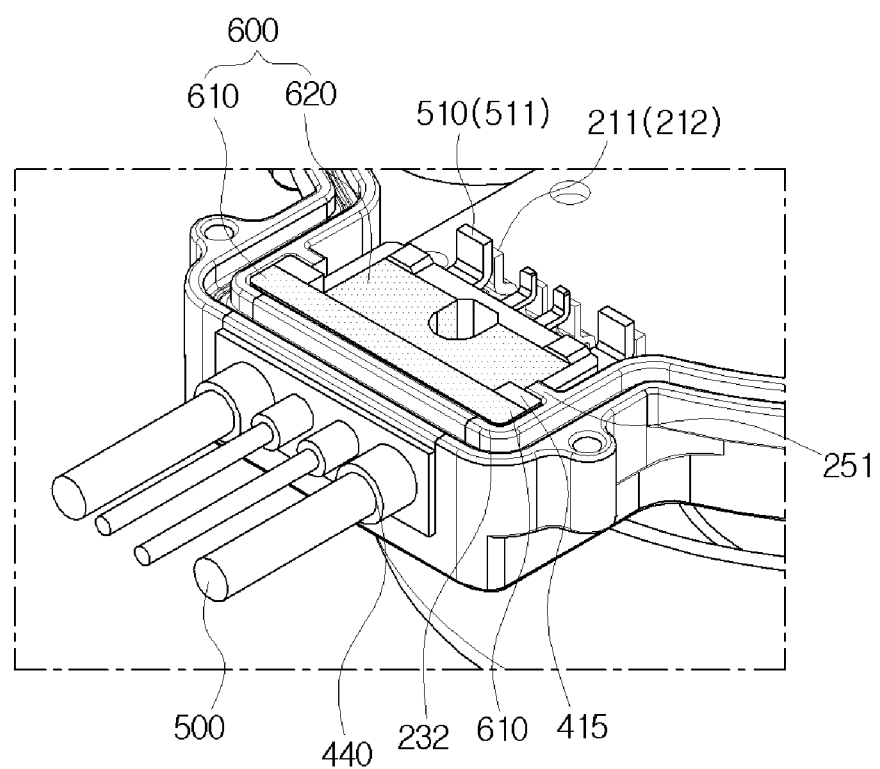
FIGS. 8 and 9 are a perspective view and a top plan view of a state where the connector block assembling part of FIG. 7 is assembled to an open side of the inverter housing.
Figure 9:
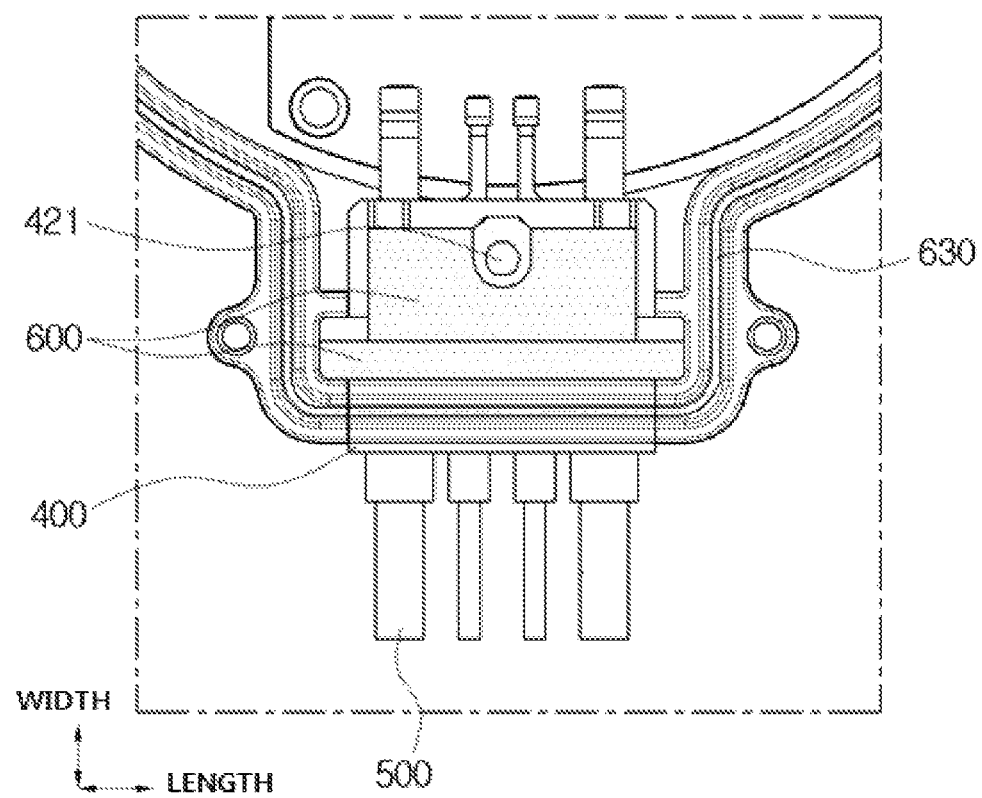
Figure 10:
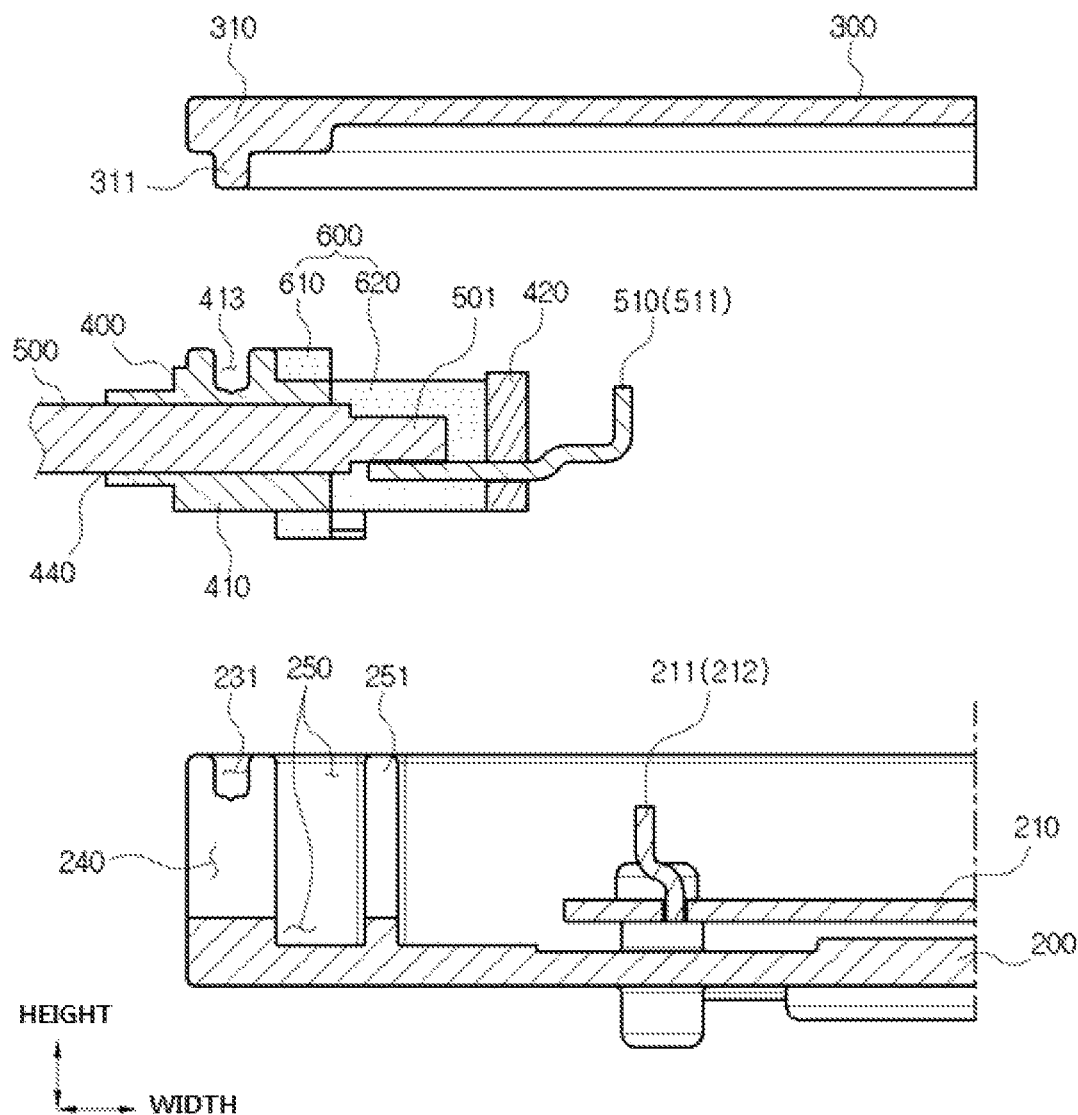
FIGS. 10 and 11 are an exploded cross-sectional view before the connector block assembling part according to the present invention is assembled with the inverter housing and the cover and an assembled cross-sectional view after the assembling.
Figure 11:
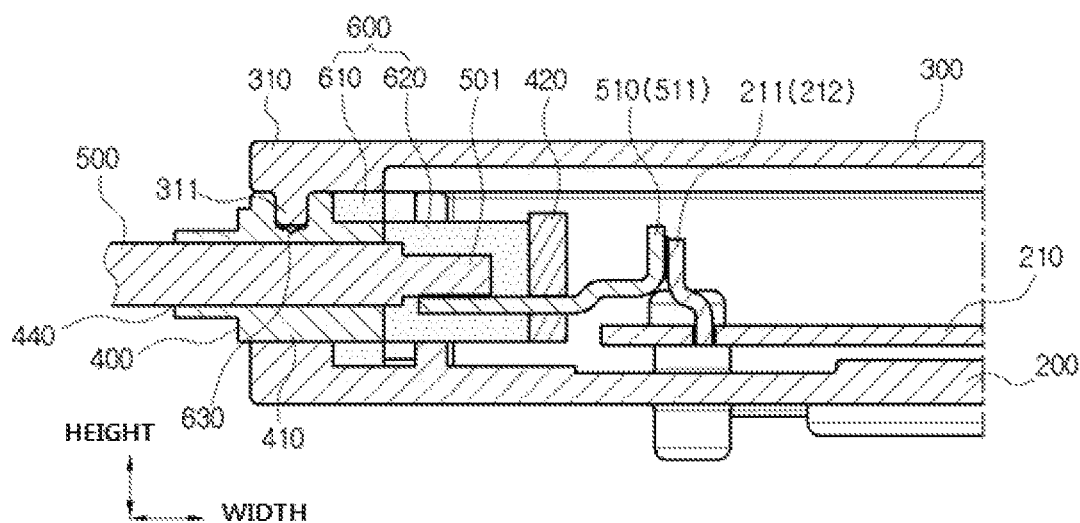

FIG. 2 is an assembled perspective view illustrating an inverter built-in BLDC motor according to an exemplary embodiment of the present invention, FIG. 3 is an exploded perspective view of a state where the inverter built-in BLDC motor according to the exemplary embodiment of the present invention is turned over, and FIGS. 4 to 11 are perspective views, a plan view, and cross-sectional views illustrating a state in which an inverter housing, a cover, a connector block, terminals, and a sealing portion according to an exemplary embodiment of the present invention are exploded or assembled.

As illustrated, an inverter built-in BLDC motor 1000 according to an exemplary embodiment of the present invention includes: an inverter housing 200 having one side coupled to a motor 100, an inside formed to be hollow, and the other side formed to be open, provided with an opening portion 240 through which a portion of an edge wall 230 is open, and having a PCB substrate 210 provided in the hollow portion; a cover 300 coupled to an open lower side of the inverter housing 200 to seal a surface contacting the inverter housing 200; a connector block 400 interposed in a space formed by the opening portion 240 of the inverter housing 200 and the cover 300 and provided with an electric wire through hole 440 in a width direction and inserted to have an electric wire 500 penetrating therethrough; an electric wire side terminal 510 coupled to an end 501 of the electric wire 500 penetrating through the connector block 400; and a sealing portion 600 formed to be bonded to the connector block 400 to enclose both surfaces in a length direction and both surfaces in a height direction of the connector block 400 and bonded to an inner side surface in a width direction of the connector block 400 from which the end 501 of the electric wire 500 is drawn out and the end 501 of the electric wire 500, in which the sealing portion 600 is formed to seal between a circumference in the height direction and the length direction of the connector block 400 and the inverter housing 200 and an inner side surface of the cover 300 and seal between the electric wire 500 coupled by penetrating through the electric wire through hole 440 and the connector block 400.

First, the motor 100 may be a BLDC motor and may be an outer type BLDC motor of which the inside is provided with stator around which a driving coil is wound and the outer side is covered in a casing form and having a rotor coupled to a permanent magnet to rotate the rotor on the outer side and may also be an inner type BLDC motor of which the inside is provided with a rotor and the outer side is provided with a stator to rotate the rotor on the inside.

The inverter housing 200 has an upper side coupled to the motor 100, a lower side formed to be open, and an inside formed to be hollow. Here, the hollow inside may be provided with the PCB substrate 210 for operating the motor 100 to couple between the PCB substrate 210 and the motor 100. Further, the inverter housing 200 may be provided with the edge wall 230 protruding downward along the circumference and provided with the opening portion 240 through which a portion of the edge wall 230 is open.

The cover 300 may be coupled to the inverter housing 200 to form a space therein, and the PCB substrate 210 may be provided in the space formed therein. Further, the cover 300 may be coupled to the open lower side of the inverter housing 200 and may be formed so that the surface where the inverter housing 200 and the cover 300 are coupled to each other is sealed. At this time, the opening portion 240 formed in the inverter housing 200 may be in an open state in the state where the inverter housing 200 and the cover 300 are coupled.

The connector block 400 is disposed in the opening portion 240 and may be interposed in the space formed by the opening portion 240 of the inverter housing 200 and the cover 300. That is, as illustrated, the assembling part 410 of the connector block 400 may be interposed between the inverter housing 200 and the cover 300 so as to block the opening portion 240. Further, the electric wire through hole 440 penetrates through both surfaces of the assembling part 410 in a width direction so that the electric wire 500 may be inserted into and penetrate through the assembling part 410 of the connector block 400 and the electric wire 500 is formed in several strands including a power line and a communication line and therefore a plurality of electric wire through holes 440 may be formed.

The electric wire side terminal 510 passes through the electric wire through hole 440 formed in the assembling part 410 of the connector block 400 to be connected to the end 501 of the electric wire 500 drawn out toward the inner side surface in the width direction of the assembling part 410. At this time, the electric wire side terminal 510 may be formed in plural to be coupled to each of the electric wires, and may be coupled by soldering or the like so that the end 501 of the electric wire 500 and the electric wire side terminal 510 overlap with each other.

The sealing portion 600 may be formed to enclose both surfaces in the length direction and both surfaces in the height direction of the assembling part 410 of the connector block 400 and may be bonded to the assembling part 410. Further, the sealing portion 600 may be formed to be bonded to the inner side surface in the width direction of the assembling part 410 that is a part where the end 501 of the electric wire 500 passing through the electric wire through hole 440 is drawn out and the end 501 of the electric wire 500.

Therefore, the sealing portion 600 formed to enclose both surfaces in the length direction and both surfaces in the height direction of the assembling part 410 may seal between the connector block 400 and the inner side surface of the inverter housing 200 and between the connector block 400 and the inner side surface of the cover 300. Further, the sealing portion 600 formed to be bonded to the inner side surface in the width direction of the assembling part 410 that is the part where the end 501 of the electric wire 500 passing through the electric wire through hole 440 is drawn out and the end 501 of the electric wire 500 may seal between the electric wire 500 coupled by penetrating through the electric wire through hole 440 and the connector block 400.

In this way, the inverter built-in BLDC motor according to the exemplary embodiment of the present invention may easily seal between the inverter unit and the connector block and seal between the connector block and the electric wires by forming the connector block for water tightness with the electric wires connected to the inverter unit and simplifying the parts for forming the watertight structure.

Further, the sealing portion 600 is insert-injected and thus may be integrally formed with the connector block 400 and the electric wire 500.

That is, the sealing portion 600 formed to enclose both surfaces in the length direction and both surfaces in the height direction of the assembling part 410 of the connector block 400 and the sealing portion 600 formed to be bonded to the inner side surface in the width direction of the assembling part 410 that is the part where the end 501 of the electric wire 500 passing through the electric wire through hole 440 is drawn out may be integrally formed with the connector block 400 and the electric wire 500 by the insert injection. For example, the electric wires 500 are inserted into the electric wire through hole 440 of the connector block 400 and thus the electric wires 500 is inserted so that the ends 501 of the electric wires 500 passes through the electric wire through hole 440 and then the sealing portion 600 may be integrally formed with the connector block 400 by the insert injection. At this time, the sealing portion is insert injected in the state where the ends 501 of the electric wires 500 are coupled to the electric wire side terminal 510 by soldering, such that the connector block 400, the electric wire 500, and the electric wire side terminal 510 may be integrally formed.

Here, the sealing portion 600 may be formed in various ways and forms other than the insert injection as described above. For example, the sealing portion 600 may seal both of the part filled with liquid or gel type silicon or the like and a part contacting the silicon by applying or filling the space in which the sealing portion 600 needs to be formed with the silicon and then curing the silicon. At this time, the silicon may be filled in the state where the electric wires 500 are assembled in the connector block 400 to penetrate through the electric wire through hole 440, the silicon may also be filled in the state where the electric wire side terminal 510 is coupled to the end 501 of the electric wire 500, and the connector block 400 coupled to the electric wire 500 and the electric wire side terminal 510 is assembled in the inverter housing 200 and then the silicon is filled, and then the connector block 400 is covered with the cover 300 to be coupled to the inverter housing 200, such that the sealing portion 600 may be formed. Further, the motor 100 is disposed at the lower side and the inverter housing 200 is disposed at the upper side and the open surface of the inverter housing 200 faces up, the connector block 400 in which the electric wire 500, the electric wire side connector 510, and the sealing portion 600 are assembled is assembled in the opening portion 240 of the inverter housing 200, and then the connector block 400 may have the upper side covered with the cover 300 to be coupled to the inverter housing 200.

Therefore, both side surfaces in the height direction and both side surfaces in the length direction of the connector block 400 are coupled to each other to be enclosed by the inverter housing 200 and the cover 300 and the sealing portion 600 may seal between the inverter housing 200 and the connector block 400 and the cover 300 and the connector block 400. Further, the sealing portion 600 may seal between the electric wire 500 inserted to penetrate through the electric wire through hole 440 and the connector block 400. Further, the inside of the electric wire through hole 440 may be partially filled with a material forming the sealing portion 600 and the sealing portion 600 may also be formed between the outer side of the electric wire 500 and the electric wire through hole 440.

Further, the sealing portion 600 is formed to be bonded to the connector block 400 to enclose both surfaces in the length direction and both surfaces in the height direction of the connector block 400 and may include a first sealing portion 610 formed to be equal to or greater than the length and width of the connector block 400 and a second sealing portion 620 formed to be bonded to the inner side surface in the width direction of the connector block 400 from which the end 501 of the electric wire 500 is drawn out and the end 501 of the electric wire 500.

That is, the first sealing portion 610 may be formed to enclose a portion of the assembling part 410 of the connector block 400 in the width direction and the first sealing portion 610 may be formed to enclose both surfaces in the length direction and both surfaces in the height direction of the assembling part 410. Therefore, the first sealing portion 610 is formed in a rectangular ring form as illustrated so that the inside thereof may be bonded to the assembling part 410 and the outer side thereof may adhere to the inverter housing 200 and the cover 300 to seal the contact surface. Further, the second sealing portion 620 may be formed to be bonded to the inner side surface in the width direction of the connector block 400 from which the end 501 of the electric wires 500 is drawn out and the end 501 of the electric wires 500. Thus, the space between the electric wire 500 and the electric wire through hole 440 may be sealed.

Further, the connector block 400 is provided with a flange 415 protruding in the width direction and the length direction and the first sealing portion 610 is formed to be bonded to one side surface in the width direction of the flange 415.

That is, as illustrated, the connector block 400 has the flange 415 protruding from both sides in the length direction and both sides in the width direction in the assembling part 410 and the first sealing portion 610 may be bonded to the surface in the width direction toward the outside of the inverter housing 200 among both surfaces in the width direction of the flange 415.

Therefore, the flange 415 may serve to support the first sealing portion 610, in particular, improve structural rigidity of the flange 415 against a force that may be applied to the first sealing portion 610 in the width direction.

Further, the flange 415 may be provided with the communicating part 416 connecting between both side surfaces in the width direction.

That is, the first sealing portion 610 and the second sealing portion 620 may be formed integrally with the connector block 400 through the double injection, such that the first sealing portion 610 and the second sealing portion 620 may be integrally formed to be connected to each other as one by the communicating part 416 connecting between both side surfaces in the width direction of the flange 415. At this time, the communicating part 416 may be variously formed. For example, as illustrated, the communicating part 416 may be formed in the form in which a portion of the upper side and a portion of the lower side in the height direction of the flange are removed and may also be formed in a communicating hole formed to penetrate through the flange 415 in the width direction.

In this way, the form of the mold for the double injection may also be simplified and the sealing portion 600 may be more firmly bonded to the connector block 400 to keep the sealing force for a long period of time.

Further, the inverter housing 200 may have a guide groove 250 concavely formed on the inner side surface thereof and thus the flange 415 of the connector block 400 and the first sealing portion 610 may be inserted into and seated on the guide groove 250.

That is, as illustrated as an example, a portion of the ends 232 of the edge wall at the portion where the opening portion 240 of the inverter housing 200 is formed are formed to protrude in the length direction, a stepped part 241 is formed, a guide rib 251 is formed to protrude on the inner side surface of the inverter housing 200 while being spaced inwardly in the width direction from the end 232 of the edge wall, such that the guide groove 250 may be formed between the end 232 of the edge wall and the stepped part 241 and the guide rib 251. At this time, the guide groove 250 is formed in the height direction and the length direction, and the flange 415 of the connector block 400 and both sides in the length direction and the lower side in the height direction of the first sealing portion 610 may be inserted into and seated on the guide groove 250 in the drawings.

In this way, the connector block 400 provided with the sealing portion 600 may be easily assembled in the inverter housing 200 by inserting the flange 415 and the first sealing portion 610 along the guide groove 250 from above. By doing so, the sealing force between the inverter housing 200, the cover 300, and the connector block 400 may be improved.

Further, the inverter housing 200 may have an assembling part 410 of the connector block 400 inserted between ends 232 of the edge walls on both sides in a length direction with which the opening portion 240 is provided, a coupling groove 231 may be formed along the edge wall 230 of the inverter housing 200, the assembling part 410 of the connector block 400 may be provided with a sealing material applying groove 413 connected to the coupling groove 231, a protruding part 311 may be formed along the edge wall 310 of the cover 300 so that the protruding part 311 is inserted into the coupling groove 231 and the sealing material applying groove 413.

That is, to improve the coupling force and the sealing force at the part where the inverter housing 200 and the cover 300 contact each other and the part where the cover 300 and the connector block 400 contact each other, the coupling groove 231 may be formed at the upper side along the edge wall 230 of the inverter housing 200 and the sealing material applying groove 413 connected to the coupling groove 231 may be formed at the assembling part 410 of the connector block 400, such that the protruding part 311 formed on the cover 300 may be inserted into the coupling groove 231 and the sealing material applying groove 413.

Further, the sealing portion 600 may be formed by the insert injection or the application or may be formed of the O-ring.

That is, the sealing portion 600 may be integrally formed by the insert injection or the application to facilitate sealing after the connector block 400 and the electric wire 500 are assembled. Alternatively, the O-ring may also be coupled to enclose the connector blocks 400 so as to seal both surfaces in the length direction and both surfaces in the height direction in which the connector block 400 contacts the inverter housing 200 and the cover 300 and even the part where the connector block 400 and the electric wire 500 contact each other may be sealed by having the O-ring interposed therebetween.

Further, the coupling groove 231 and the sealing material applying groove 413 may be filled with a sealing material 630 to seal between the coupling groove 231 and the protruding part 311 and between the sealing material applying groove 413 and the protruding part 311.

That is, the coupling groove 231 and the sealing material applying groove 413 are applied or inserted with the sealing material 630 and then are coupled to the cover 300 to achieve the reliable sealing. Here, the coupling groove 231 of the inverter housing 200 and the sealing material applying groove 413 of the connector block 400 may have the same cross section form, height, and width to be connected to each other, thereby easily applying the sealing material 630 at a time.

Further, the connector block 400 may have a blocking plate 420 formed in the inside direction of the inverter housing 200 in the width direction from the assembling part 410, the blocking plate 420 may be formed to enclose the end 501 of the electric wire 500 drawn out toward the inside in the width direction through the electric wire through hole 440 to form a space portion 430 on the inside, and the electric wire side terminal 510 may be coupled to penetrate through the blocking plate 420 and thus the end 501 of the electric wire 500 may be coupled to the electric wire side terminal 510 in the space portion 430.

That is, as illustrated, the connector block 400 is formed with the blocking plate 420 inwardly in the width direction of the assembling part 410, and the blocking plate 420 may be formed in a '⊏'-letter shape so that the ends extending from both sides of the length direction of the assembling part 410 toward the inner side in the width direction is connected to each other in the length direction. In this way, the ends 501 of the electric wires 500 may be located in the space portion 430 which is the inside space formed by the assembling part 410 and the blocking plate 420. At this time, the electric wire side terminals 510 may be coupled to the blocking plate 420 that is disposed to face the assembling part 410 and the electric wire side terminals 510 are coupled to penetrate through the blocking plate 420 so that the end 501 of the electric wire 500 and one side of the electric wire side terminal 510 may be coupled to each other by welding, or the like in the space part 430.

Also, the second sealing portion 620 may be formed by filling the space portion 430 of the connector block 400.

That is, the second sealing portion 620 is formed to fill the space portion 430 in the state where the end 501 of the electric wire 500 and one side of the electric wire side terminal 510 are coupled by welding or the like so that the welded part where the end 501 of the electric wire 500 and one side of the electric wire side terminal 510 are coupled to each other is enclosed by the second sealing portion 620 to be sealed and fixed.

Further, the inverter housing 200 may be provided with a block fastening part 220, the connector block 400 may be provided with a coupling portion 421, and the coupling portion 421 may be fixedly fastened to the block fastening part 220 by the fastener 422.

That is, as illustrated, the inverter housing 200 may be provided with the block fastening part 220 having a female screw thread and the connector block 400 may be formed with the coupling portion 421 provided with the through hole so that the connector block 400 may be firmly fixed to the inverter housing 200 by the fastener 422 such as a bolt. In this case, for example, the coupling portion 421 may be formed on the blocking plate 420 of the connector block 400, and the coupling portion 421 may be disposed in the space portion 430. The coupling portion 421 may be disposed at a central part in the length direction and thus the connector block 400 may be fixed to the inverter housing 200 by one fastener 422. Here, the part where the coupling portion 421 is formed may not be provided with the second sealing portion 620.

Further, the PCB substrate 210 provided in the inverter housing 200 may be provided with a substrate side terminal 211 to couple between the substrate side terminal 211 and the electric wire side terminal 510.

That is, the substrate side terminal 211 may be formed on the PCB substrate 210 provided in the inverter housing 200 so as to correspond to the electric wire side terminal 510, such that when the connector block 400 in which the electric wire 500, the electric wire side terminal 510, and the sealing portion 600 are integrally formed is assembled in the inverter housing 200, the substrate side terminal 211 and the electric wire side terminal 510 may overlap with each other or face each other while being close to each other and may be coupled to each other by soldering, or the like.

At this time, the end of the substrate side terminal 211 and the end of the electric wire side terminal 510 may be bent upward to face each other and the bent bending portions 212 and 511 may be coupled to each other while being in surface contact with each other.

That is, as illustrated, the end of the substrate side terminal 211 and the end of the electric wire side terminal 510 are bent upward so as to face each other, such that the substrate side terminal 211 and the electric wire side terminal 510 may be in surface contact with each other by the elastic force of the terminals. Further, the bending portions 212 and 511 may be easily coupled by soldering, laser welding, electric resistance welding, or the like, such that the assembling performance may be improved.

Further, the PCB substrate 210 provided in the inverter housing 200 is provided with the substrate side PCB terminal 211a, the stator 110 provided inside the motor 100 is provided with the three-phase terminal 120, the three-phase terminal 120 of the stator 110 penetrates through the inverter housing 200 and the PCB substrate 210 so that the substrate side PCB terminal 211a and the three-phase terminal 120 may be coupled to each other while being in surface contact with each other.

Figure 12:
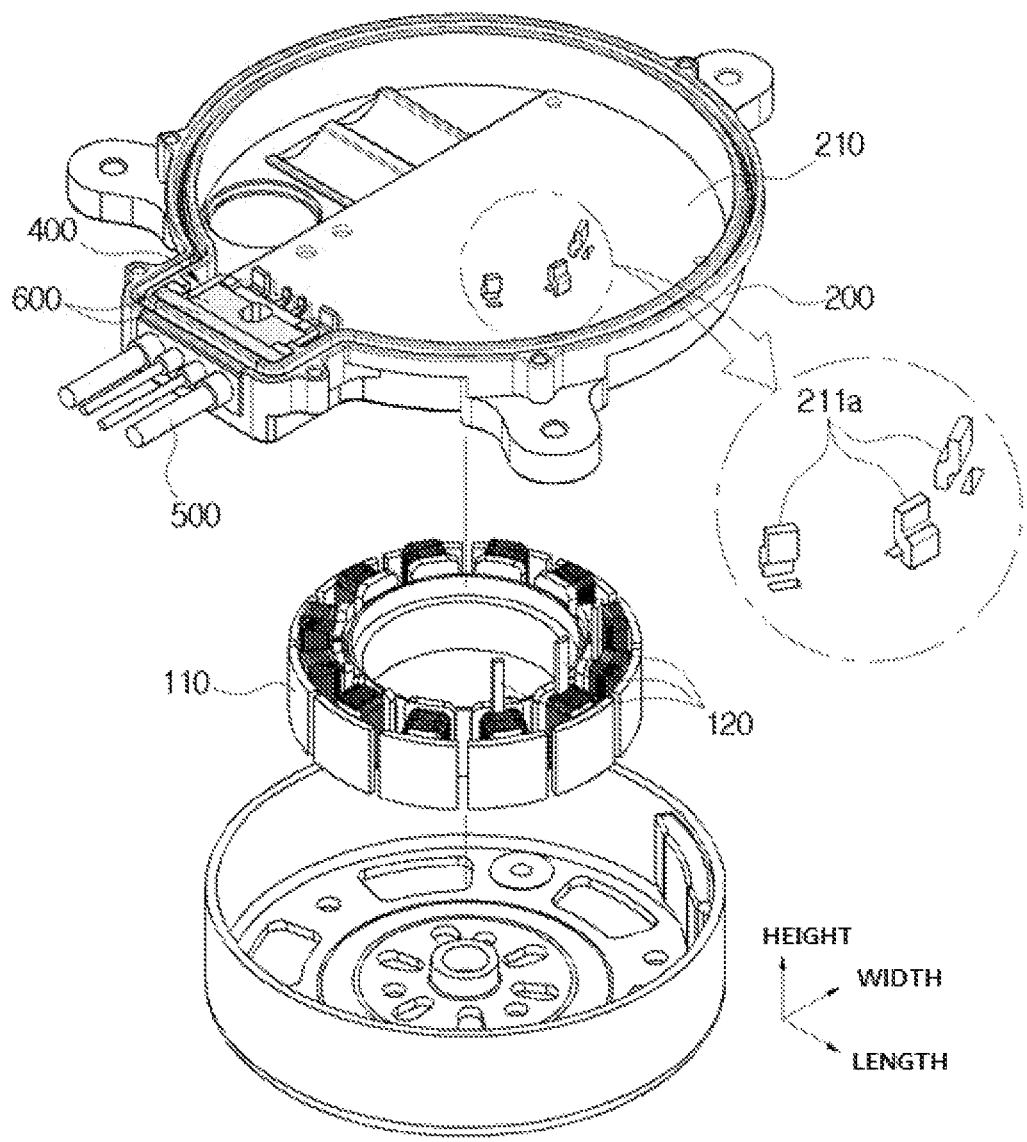
FIGS. 12 to 14 are an exploded perspective view, an assembled perspective view, and a partial cross-sectional view illustrating a coupling structure of a three-phase terminal of a stator according to an exemplary embodiment of the present invention and a board side PCB terminal.
Figure 13:
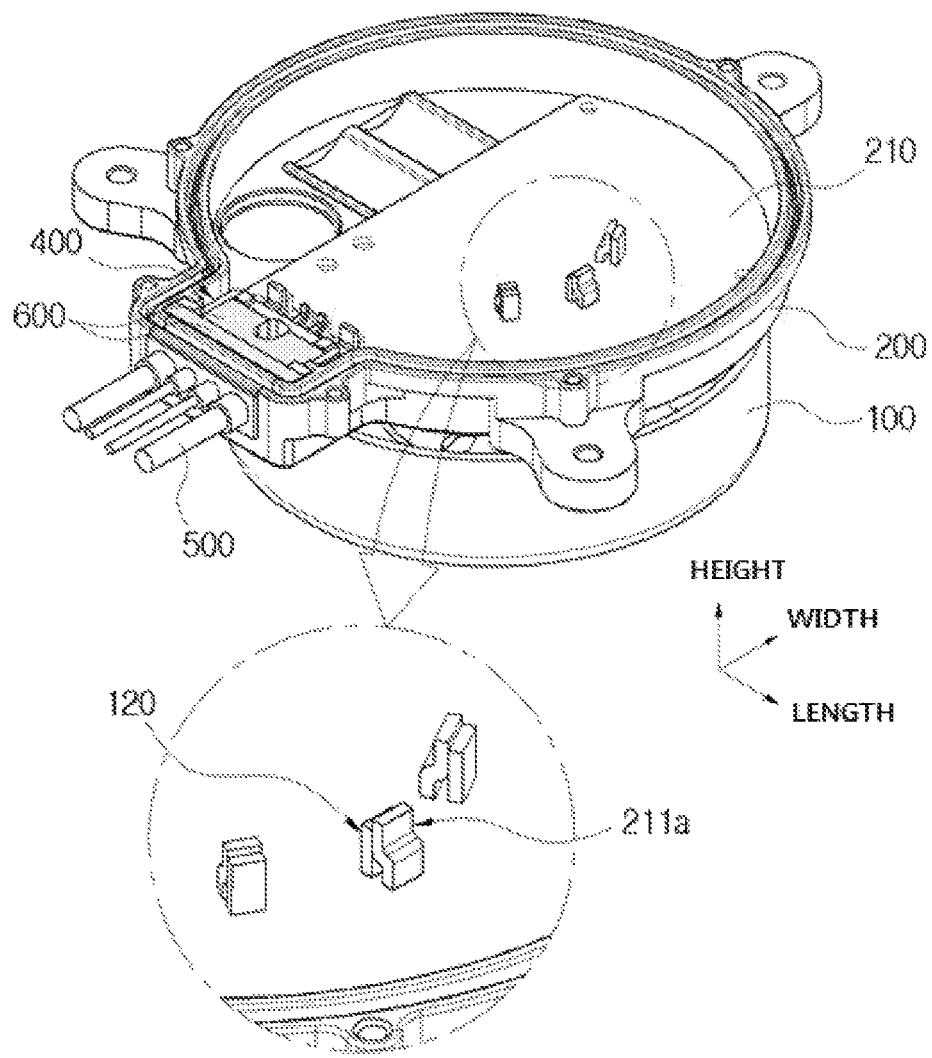
Figure 14:
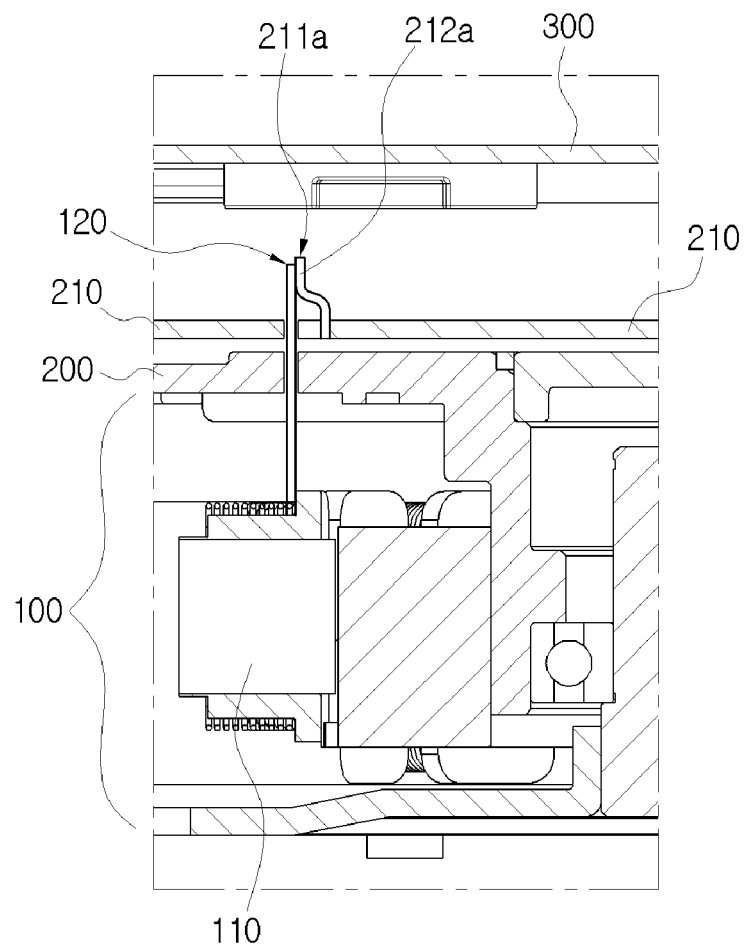

That is, referring to FIGS. 12 to 14, the inside of the motor 100 coupled to the inverter housing 200 is provided with the stator 110 around which the driving coil is wound, such that the stator 110 may be provided with the three-phase terminals 120 in the protruding form. Further, the PCB substrate 210 provided in the inverter housing 200 may be provided with the substrate side PCB terminals 211a protruding upwardly. In this way, the three-phase terminals 120 of the stator 110 penetrates through the inverter housing 200 and the PCB substrate 210 so that the substrate side PCB terminal 211a and the three-phase terminal 120 are easily coupled to each other while being in surface contact with each other. At this time, the part where the three-phase terminal 120 penetrates through the inverter housing 200 may be sealed with the sealing material, or the like.

Further, the substrate side PCB terminal 211a extends upward from the PCB substrate 210 and an upper end thereof is bent toward a direction parallel with the side of the PCB substrate 210 and then bent upward to form a bending portion 212a and the bending portion 212a and the three-phase terminal 120 may be in surface contact with each other.

That is, as illustrated, the substrate side PCB terminal 211a may be provided with the bent part 212a by bending upwardly the end horizontally formed along the width direction that is a horizontal direction and a plane in the length direction and the three-phase terminal 120 may be in surface contact with the bending portion 212a. In this way, it is possible to facilitate the surface contact and the coupling by the elasticity of the terminals.

The inverter built-in BLDC motor according to the exemplary embodiment of the present invention may easily seal between the inverter unit and the connector block and seal between the connector block and the electric wires by forming the connector block for water tightness with the electric wires connected to the inverter unit and simplifying the parts for forming the watertight structure.

Further, it is possible to improve the assembling performance by easily coupling the electric wires to the PCB substrate.

The present invention is not limited to the above-mentioned embodiments but may be variously applied, and may be variously modified by those skilled in the art to which the present invention pertains without departing from the gist of the present invention claimed in the claims.

What is claimed is:

1. An inverter built-in brushless direct current (BLDC) motor, comprising:
    an inverter housing having one side coupled to a motor, an inside formed to be hollow, and the other side formed to be open, provided with an opening portion through which a portion of an edge wall is open, and having a PCB substrate provided in the hollow portion;
    a cover coupled to an open lower side of the inverter housing to seal a surface contacting the inverter housing;
    a connector block interposed in a space formed by the opening portion of the inverter housing and the cover and provided with an electric wire through hole in a width direction so that the electric wire is inserted to penetrate through the electric wire through hole;
    an electric wire side terminal coupled to an end of the electric wire penetrating through the connector block; and
    a sealing portion bonded to the connector block to enclose both surfaces in a length direction and both surfaces in a height direction of the connector block and bonded to an inner side surface in the width direction of the connector block from which the end of the electric wire is drawn out and the end of the electric wire,
    wherein the sealing portion seals between a circumference in the height direction and the length direction of the connector block and an inner side surface of the inverter housing and wherein the cover seal between the electric wire coupled by penetrating through the electric wire through hole and the connector block.

2. The inverter built-in BLDC motor of claim 1, wherein the sealing portion includes:
    a first sealing portion formed to be bonded to the connector block to enclose both surfaces in the length direction and both surfaces in the height direction of the connector block and to be equal to or greater than a length and a width of the connector block; and
    a second sealing portion formed to be bonded to the inner side surface in the width direction of the connector block from which the end of the electric wire is drawn out and the end of the electric wire.

3. The inverter built-in BLDC motor of claim 2, wherein the connector block is provided with a flange protruding in the width direction and the length direction and the first sealing portion is formed to be bonded to one side surface in a width direction of the flange.

4. The inverter built-in BLDC motor of claim 3, wherein the inverter housing has a guide groove concavely formed on the inner side surface thereof and thus the flange and the first sealing portion of the connector block are inserted into and seated on the guide groove.

5. The inverter built-in BLDC motor of claim 1, wherein the inverter housing has an assembling part of the connector block inserted between ends of edge walls on both sides in a length direction with which the opening portion is provided, and a coupling groove is formed along the edge wall of the inverter housing, the assembling part of the connector block is provided with a sealing material applying groove connected to the coupling groove, a protruding part is formed along the edge wall of the cover so that the protruding part is inserted into the coupling groove and the sealing material applying groove.

6. The inverter built-in BLDC motor of claim 1, wherein the sealing portion is formed by insert injection or application or is formed of an O-ring.

7. The inverter built-in BLDC motor of claim 5, wherein the coupling groove and the sealing material applying groove are filled with a sealing material to seal between the coupling groove and the protruding part and between the sealing material applying groove and the protruding part.

8. The inverter built-in BLDC motor of claim 1, wherein the connector block has a blocking plate formed in an inside direction of the inverter housing in the width direction from an assembling part, and the blocking plate is formed to enclose the end of the electric wire drawn out toward the inside in the width direction through the electric wire through hole to form a space portion on the inside, and the electric wire side terminal is coupled to penetrate through the blocking plate and thus the end of the electric wire is coupled to the electric wire side terminal in the space portion.

9. The inverter built-in BLDC motor of claim 8, wherein a second sealing portion is formed by filling the space portion of the connector block.

10. The inverter built-in BLDC motor of claim 9, wherein the inverter housing is provided with a block fastening part, the connector block is provided with a coupling portion, and the coupling portion is fixedly fastened to the block fastening part by the fastener.

11. The inverter built-in BLDC motor of claim 8, wherein the PCB substrate is provided in the inverter housing and provided with the substrate side terminal that is coupled between the substrate side terminal and the electric wire side terminal.

12. The inverter built-in BLDC motor of claim 11, wherein an end of the substrate side terminal and an end of the electric wire side terminal are bent upward to face each other and the bent bending portions are coupled to each other while being in surface contact with each other.

13. The inverter built-in BLDC motor of claim 1, wherein the PCB substrate provided in the inverter housing is provided with a substrate side PCB terminal and a stator provided in the motor is provided with a three-phase terminal, and the three-phase terminal of the stator penetrates through the inverter housing and the PCB substrate so that the substrate side PCB terminal and the three-phase terminal are coupled to each other while being in surface contact with each other.

* * * * *